United States Patent
Roberts

(10) Patent No.: US 7,176,897 B2
(45) Date of Patent: Feb. 13, 2007

(54) CORRECTION OF MEMORY EFFECT ERRORS IN FORCE-BASED TOUCH PANEL SYSTEMS

(75) Inventor: Jerry B. Roberts, Arlington, MA (US)

(73) Assignee: 3M Innovative Properties Company, St. Paul, MN (US)

(*) Notice: Subject to any disclaimer, the term of this patent is extended or adjusted under 35 U.S.C. 154(b) by 878 days.

(21) Appl. No.: 10/150,704

(22) Filed: May 17, 2002

(65) Prior Publication Data

US 2003/0214486 A1 Nov. 20, 2003

(51) Int. Cl.
*G09G 5/00* (2006.01)

(52) U.S. Cl. .................... 345/173; 178/18.01

(58) Field of Classification Search ........ 345/173–174, 345/176, 178–179, 156; 178/18.01, 18.03, 178/18.05, 18.06, 18.07; 73/865.7; 341/33, 341/34

See application file for complete search history.

(56) References Cited

U.S. PATENT DOCUMENTS

| | | | |
|---|---|---|---|
| 3,657,475 A | 4/1972 | Peronneau et al. |
| 4,089,036 A | 5/1978 | Geronime |
| 4,121,049 A | 10/1978 | Roeber |
| 4,340,777 A | 7/1982 | DeCosta et al. |
| 4,355,202 A | 10/1982 | DeCosta et al. |
| 4,389,711 A | 6/1983 | Hotta et al. |
| 4,484,179 A | 11/1984 | Kasday |
| 4,495,434 A | 1/1985 | Diepers et al. |
| 4,511,760 A | 4/1985 | Garwin et al. |
| 4,542,375 A | 9/1985 | Alles et al. |
| 4,550,384 A | 10/1985 | Kimura |
| 4,558,757 A | 12/1985 | Mori et al. |
| 4,675,569 A | 6/1987 | Bowman et al. |
| 4,697,049 A | 9/1987 | Peemoller et al. |
| 4,745,565 A | 5/1988 | Garwin et al. |
| 4,771,277 A | 9/1988 | Barbee et al. |

(Continued)

FOREIGN PATENT DOCUMENTS

EP  0 531 815  3/1993

(Continued)

OTHER PUBLICATIONS

"Force Concentrator For Touch Sensitive Panel Using Snap-Action Switches", IBM Technical Disclosure Bulleting #NN7606238, vol. 19, Jun. 1976.

(Continued)

*Primary Examiner*—Richard Hjerpe
*Assistant Examiner*—Abbas Abdulselam
(74) *Attorney, Agent, or Firm*—Robert J. Pechman

(57) ABSTRACT

A method and system are provided to correct one or more sensor signals having errors induced by a viscoelastic effect. The errors may be characterized using a combination of linear or non linear functions. The characterization of the errors may be used to reduce the errors from the sensor signals. In one aspect of the invention, the errors associated with a viscoelastic effect are reduced from the sensor signals by filtering the sensor signals, scaling the output of the filter circuit to produce correction factors and subtracting the correction factors from the sensor signals. Corrected sensor signals may be used to determine the location of a touch on a touch screen with improved accuracy.

68 Claims, 13 Drawing Sheets

U.S. PATENT DOCUMENTS

| | | | |
|---|---|---|---|
| 4,775,765 | A | 10/1988 | Kimura et al. |
| 4,816,811 | A | 3/1989 | Bogatin et al. |
| 4,875,378 | A | 10/1989 | Yamazaki et al. |
| 4,893,115 | A | 1/1990 | Blanchard |
| 4,918,262 | A | 4/1990 | Flowers et al. |
| 4,983,787 | A | 1/1991 | Kunikane |
| 5,038,142 | A | 8/1991 | Flowers et al. |
| 5,060,066 | A | 10/1991 | Roberts |
| 5,072,076 | A | 12/1991 | Camp, Jr. |
| 5,241,308 | A | 8/1993 | Young |
| 5,376,948 | A | 12/1994 | Roberts |
| 5,541,372 | A | 7/1996 | Baller et al. |
| 5,543,588 | A | 8/1996 | Bisset et al. |
| 5,543,591 | A | 8/1996 | Gillespie et al. |
| 5,563,632 | A | 10/1996 | Roberts |
| 5,565,658 | A * | 10/1996 | Gerpheide et al. ....... 178/18.02 |
| 5,708,460 | A | 1/1998 | Young et al. |
| 5,714,694 | A | 2/1998 | Diessner |
| 5,790,107 | A * | 8/1998 | Kasser et al. ................ 345/174 |
| 5,854,625 | A | 12/1998 | Frisch et al. |
| 5,914,465 | A | 6/1999 | Allen et al. |
| 5,943,043 | A | 8/1999 | Furuhata et al. |
| 6,108,211 | A | 8/2000 | Diessner |
| 6,239,788 | B1 | 5/2001 | Nohno et al. |
| 6,285,358 | B1 | 9/2001 | Roberts |
| 6,885,365 | B1 * | 4/2005 | Kang ........................ 345/173 |
| 6,888,536 | B2 * | 5/2005 | Westerman et al. ......... 345/173 |

FOREIGN PATENT DOCUMENTS

| | | |
|---|---|---|
| JP | 61148522 | 12/1984 |

OTHER PUBLICATIONS

"Touch-Sensitive Pancake", IBM Technical Disclosure Bulleting #88A61790, Oct. 1998.

U.S. Appl. No. 09/835,049, filed Apr. 13, 2001, "Tagential Force Control In A Touch Location Device".

U.S. Appl. No. 09/835,040, filed Apr. 13, 2001, "Method And Apparatus For Force-Based Touch Input".

U.S. Appl. No. 10/121,516, filed Apr. 12, 2002, "Touch Screen with Rotationally Isolated Force Sensor".

U.S. Appl. No. 10/121,507, filed Apr. 12, 2002, "Force Sensors and Touch Panels Using Same".

U.S. Appl. No. 10/140,209, filed May 6, 2002, "Method for Improving Positioned Accuracy for a Determined Touch Input".

U.S. Appl. No. 10/142,118, filed May 8, 2002, "Baselining Techniques in Force-based Touch Panel Systems".

U.S. Appl. No. 10/147,604, filed May 17, 2002, "Calibration of Force Based Touch Panel Systems".

* cited by examiner

CORRECTION OF MEMORY EFFECT ERRORS IN FORCE-BASED TOUCH PANEL SYSTEMS

FIELD OF THE INVENTION

The present invention is directed generally to a touch screen, and more particularly to a method and system for correcting touch signal errors to improve the accuracy of locating a touch on a touch screen.

BACKGROUND

A touch screen offers a simple, intuitive interface to a computer or other data processing device. Rather than using a keyboard to type in data, a user can transfer information through a touch screen by touching an icon or by writing or drawing on a screen. Touch screens are used in a variety of information processing applications. Transparent touch screens are particularly useful for applications such as cell phones, personal data assistants (PDAs), and handheld or laptop computers.

Various methods have been used to determine touch location, including capacitive, resistive, acoustic and infrared techniques. Touch location may also be determined by sensing the force of the touch through force sensors coupled to a touch surface. Touch screens that operate by sensing touch force have several advantages over other technologies mentioned above. First, force sensors do not require the touch surface to be composed of special materials that may inhibit optical transmission through the touch surface, as in a resistive touch sensor. Further, force sensors do not rely on a lossy electrical connection to ground, as is required by a capacitive touch screen, and can be operated by a finger touch, gloved hand, fingernail or other nonconductive touch instrument. Unlike surface acoustic wave technology, force sensors are relatively immune to accumulations of dirt, dust, or liquids on the touch surface. Finally, a force sensor is less likely to detect a close encounter with the touch surface as an actual touch, which is a common problem with infrared touch screens.

Force based touch screens are potentially prone to errors in reported touch location from a number of sources. A force responsive touch signal produced by touch screen force sensors may be affected by a variety of static and dynamic factors in addition to the touch force. These factors may be considered noise sources with respect to the touch signal. Noise may be introduced through the touch screen electronics, or it may be mechanical in nature. Electrical noise may be introduced, for example, in the touch sensing, amplification, data conversion or signal processing stages. Mechanical noise may arise from torsion of the touch screen, movement of the touch screen device, vibration of the touch screen, and other transient factors. The touch screen force sensors may be affected by the weight of the touch surface and preloading forces applied to the force sensors during manufacture. In addition, noise may be introduced by the touch itself.

The touch force typically changes rapidly throughout the duration of a touch. A touch in a single location produces a touch force signal that increases in magnitude as the touch is applied and then decreases in magnitude as the touch is removed. The touch may also be moved across the surface of the touch screen, generating a changing signal at each force sensor. Accurate determination of the touch location requires analysis of touch force signals generated by the touch force, as well as elimination of the static and dynamic noise signals affecting the touch screen.

SUMMARY OF THE INVENTION

In general terms, the present invention relates to a method and system for correcting sensor system errors to improve locating of a touch on a touch screen. Features of the present invention are particularly useful when combined with a microprocessor-based system operating a display device enhanced by a transparent touch screen.

In accordance with one embodiment of the present invention, a method for determining a touch location on a touch screen is provided involving detecting one or more touch force responsive sensor signals. The sensor signals are characterized by an initial response to a step change in a touch force, the initial response being augmented by a monotonic increase in the sensor signals over a period of time. A correction factor reflective of the monotonic increase in the sensor signals is prepared. Touch location is determined using the correction value.

A further embodiment of the present invention involves detecting at least a first touch force responsive sensor signal having a deviation from a proportional response to a touch force caused be viscoelasticity. A correction factor reflective of the deviation caused by the viscoelasticity is prepared and touch location determined using the correction factor.

Yet another embodiment of the invention involves detecting one or more force responsive sensor signals having errors induced by a viscoelastic response. The one or more sensor signals are corrected by reducing the viscoelastic induced errors. Touch location is determined using the corrected sensor signals.

Another embodiment of the present invention is directed to a touch screen system comprising a touch surface, a number of touch sensors and a control system. The touch sensors are physically coupled to the touch surface and produce sensor signals in response to a touch force applied to the touch surface. The control system is coupled to the touch sensors and configured to detect a force responsive sensor signals having errors introduced by a viscoelastic response. The control system corrects the sensor signals having the errors and determines the touch location using the corrected sensor signals.

A further embodiment of the present invention is directed to a touch screen display system including a touch surface and a number of touch sensors physically coupled to the touch surface and producing sensor signals in response to a touch force on the touch surface. The system also includes a control system coupled to the touch sensors. The control system is configured to detect one or more sensor signals having errors induced by a viscoelastic response. The control system corrects the sensor signals by removing the errors and determines the location of the touch force using the corrected sensor signals. The system further includes a display for displaying information through the touch screen.

Another embodiment of the invention is directed to a display system comprising a touch screen system including a touch surface, a number of touch sensors and a control system. The display system further includes a display for displaying information and a processor coupled to the display and the touch screen for processing data to be displayed on the display and information received from the touch screen system.

In accordance with an embodiment of the invention, a system provides means for detecting one or more touch force responsive sensor signals characterized by an initial response to a step change in a touch force, the initial response being augmented by a monotonic increase in the sensor signals over a period of time, means for preparing a correction value reflective of the monotonic increase in the sensor signals, and means for determining the touch location using the correction value.

Yet another embodiment of the invention is directed to a system for determining a touch location on a touch screen using a plurality of touch sensors mechanically coupled to a touch surface. In accordance with this embodiment of the invention, the system includes means for detecting at least a first touch force responsive sensor signal having a deviation from a proportional response to a touch force caused by viscoelasticity, means for preparing a correction value reflective of the deviation caused by viscoelasticity, means for determining the touch location using the correction value.

According to another embodiment of the invention, a system for determining a touch location on a touch screen includes means for characterizing errors in one or more sensor signals, the errors associated with a viscoelastic response, means for reducing the errors in the sensor signals, and means for determining the touch location using the sensor signals having reduced errors.

A further embodiment of the invention is directed to an article of manufacture including a program storage medium readable by a computer, the medium tangibly embodying one or more programs of instructions executable by one or more computers to perform a method for determining a touch location on a touch screen using a plurality of touch sensors mechanically coupled to a touch surface. The method for determining touch location embodied in program instruction form involves detecting one or more force responsive sensor signals having errors induced by a viscoelastic response, correcting the one or more sensor signals by reducing the viscoelastic induced errors, and determining the touch location using the corrected sensor signals.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
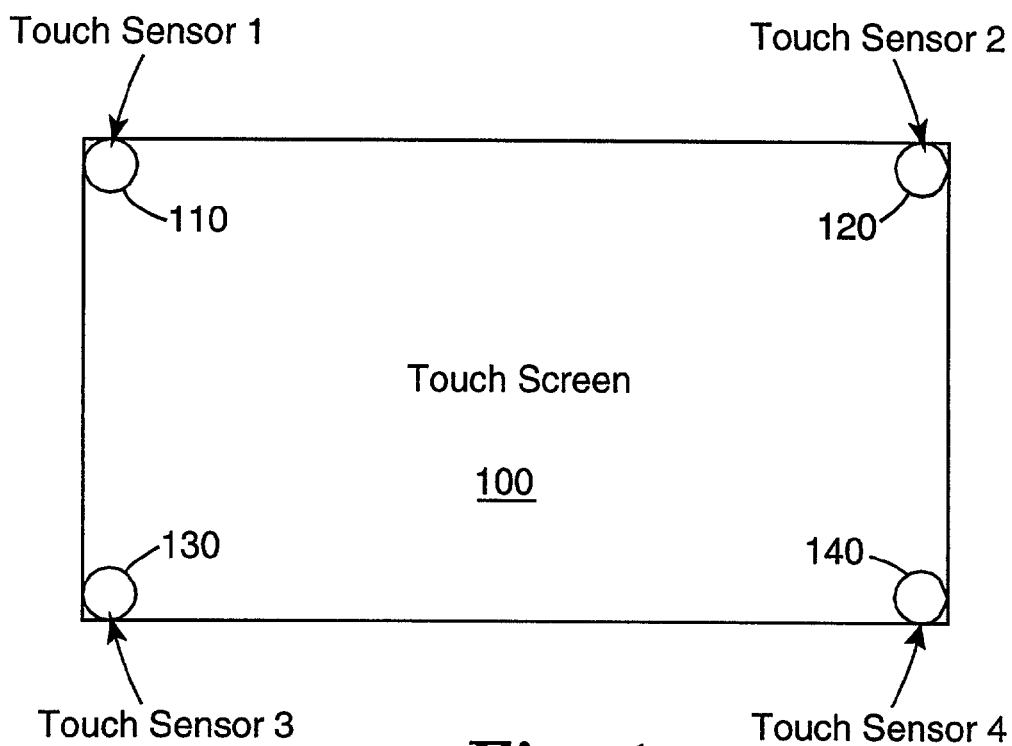
FIG. 1 schematically illustrates a top view of a touch screen with force sensors located at the corners of the touch screen in accordance with an embodiment of the invention.

The invention is amenable to various modifications and alternative forms. Specific embodiments of the invention have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following description of the illustrated embodiments, references are made to the accompanying drawings which form a part hereof, and in which is shown by way of illustration, various embodiments by which the invention may be practiced. It is to be understood that other embodiments may be utilized, and structural and functional changes may be made without departing from the scope of the present invention.

As stated above, and for other reasons stated below which will become apparent upon reading the present specification, there is a need for a method and a system for correcting various signal errors affecting sensor signals in a force-based touch screen system. Correction of sensor signal errors provides for a more accurate determination of the location of the touch on the touch screen.

The present invention is applicable to touch sensing techniques and is believed to be particularly useful when features of the present invention are combined with a data processing system operating a display device enhanced by a transparent touch screen. For example, a touch screen of the present invention may be used in a desktop, handheld or laptop computer system, a point-of-sale terminal, personal data assistant (PDA), or a cell phone. Although described in combination with a microprocessor-based system, a touch screen device of the present invention may be combined with any logic-based system, if desired.

Touch signals representing the force of a touch acting on the touch screen are produced by one or more touch sensors coupled to a touch surface of the touch screen. A touch signal may be derived from a single sensor, or by combining sensor signals from two or more touch sensors. Determination of a touch location involves analyzing the sensor signals produced by the touch sensors. A tap touch in a single location characteristically produces a touch signal that increases in magnitude as the touch is applied and then decreases in magnitude as the touch is removed. A touch may also be a continuing touch, wherein the touch continues in a particular location on the touch screen or is moved across the surface of the touch screen.

Touch sensors may not perfectly convert the applied touch force to an electrical signal representation of the touch force at the location of the sensor. For example, sensor materials may show memory effects, wherein their deformation depends not only upon force, but upon recent force history. Such a failure to follow Hooke's law may produce errors in the electrical signal representing the touch force. One aspect of the present invention provides a method for characterizing and reducing predictable errors from one or more sensor signals. The error correction methods of the present invention may be applied by either continuous time analog processing or discrete time digital processing. The corrected sensor signals may be used to improve the accuracy of the determination of the location of a touch on the touch screen.

A generalized diagram of a touch screen is illustrated in FIG. 1. A touch surface 100 is coupled to one or more touch sensors 110, 120, 130, 140. In the embodiment shown, the touch sensors 110, 120, 130, 140 are arranged at four corners of a rectangular touch surface. Although the touch screen illustrated in FIG. 1 is rectangular with sensors located at the corners, various configurations using three or more touch sensors with differing touch surface shapes may also be used.

Figure 2:
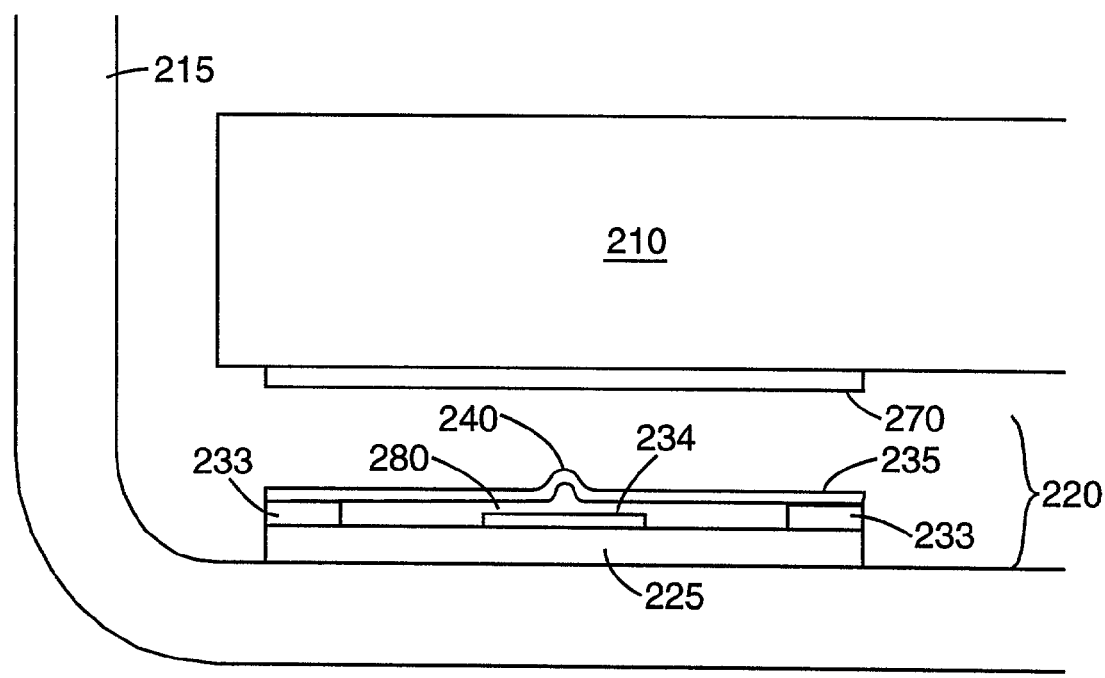
FIG. 2 schematically illustrates a cross-section view of a capacitive force sensor in accordance with an embodiment of the invention.

The sensors, 110, 120, 130, 140, may be, for example, small capacitive force sensors constructed of two capacitor plates separated by a gap. A capacitive force sensor may be arranged so that when a touch force of sufficient magnitude and direction is applied to the touch surface, one capacitor plate deflects towards the second plate. The deflection alters the distance between the capacitor plates, changing the capacitance of the sensor. The touch force may be measured by control system circuitry as a change in an alternating electrical signal applied to the touch sensor. One embodiment of a capacitive force sensor appropriate for use in touch screen applications is described in U.S. Pat. application Ser. No. 09/835,040, filed Apr. 13, 2001 and entitled "Method and Apparatus for Force-Based Touch Input," which is hereby incorporated herein by reference in its entirety. The force sensor is appropriate for use with a liquid crystal display (LCD), cathode ray tube (CRT) or other transparent display, and is schematically illustrated in FIG. 2. In this particular embodiment, the sensor measures the applied force based on the change of capacitance of a capacitive element.

A touch surface 210, or overlay, is located within a structure or housing 215. The touch surface 210 is typically transparent to allow viewing of a display or other object through the touch surface. In other applications, the touch surface 210 can be opaque.

The structure or housing 215 may be provided with a large central aperture through which the display may be viewed. If desired, the undersurface of the housing 215 may be seated directly against the surface of such a display, over the border surrounding its active area. In another embodiment, as mentioned above, the overlay may be replaced by a structure including a display unit, such as an LCD.

A capacitive sensor 220 may be positioned between the touch surface 210 and the housing 215. An interconnect 225, with attachment lands 233, may be coupled to the housing 215 by soldering, cementing, or by other methods. A conductive area forms a first conductive element 234 on the interconnect 225. A second conductive element 235 with a central protrusion 240, for example a dimple, may be attached to the lands 233 of the interconnect 225 by soldering, for example. A small gap 280 is formed between the first conductive element 234 and the second conductive element 235, either by the shape of the second conductive element 235, or by the process of attaching the second conductive element 235 to the interconnect 225. The width of the gap 280 may be approximately 1 mil, for example. A capacitor is formed by the conductive elements 234, 235 separated by the gap 280.

An optional bearing surface 270 may be interposed between the touch surface 210 and the second conductive element 235. This may protect the touch surface 210 from indentation or from damage by the protrusion 240, especially in cases where the overlay is made of softer material. The bearing surface 270 may also mount to the touch surface 210 through a thin layer (not shown) of elastomer or of highly pliable adhesive, thereby providing a lateral softening function. It will be appreciated that, in normal operation, the touch surface 210 or bearing surface 270 is in contact with the protrusion 240: these elements are shown separated only for clarity in the illustration.

The second conductive element 235 combines the functions of a spring and a capacitor plate. As a perpendicular force is applied to the touch surface 210, the second conductive element 235 flexes, decreasing the width of the gap 280 and increasing the capacitance of the sensor 220. This change in capacitance may be measured and related to the force applied to the touch surface 210. Although a touch screen using capacitive force sensors is described, other types of force sensors may be used in a similar manner, including, for example, piezoelectric sensors and strain gauge sensors.

One of the advantages of a force-based touch screen is that the number of optically distinct layers positioned between the display unit and the user is low. Typically, the overlay positioned over the display unit is a single layer of glass or relatively stiff polymer, for example polycarbonate or the like, which may be chosen for suitable optical qualities. This contrasts with other types of touch screen, such as resistive or capacitive touch screens, that require several, potentially optically lossy, layers over the display unit. The electrically conductive thin films required in resistive or capacitive touch screens typically have a high index of refraction, leading to increased reflective losses at the interface. This is a particular problem in resistive screens where there are additional solid/air interfaces and where antireflection coatings are not useful, since the conductive layers must be able to make physical contact. A screen overlay for a force-based touch screen, however, has only its upper and lower surfaces; these may be treated to reduce reflective losses and to reduce glare. For example, the overlay may be provided with matte surfaces to reduce specular reflection, and/or may be provided with anti-reflection coatings to reduce reflective losses.

Figure 3:
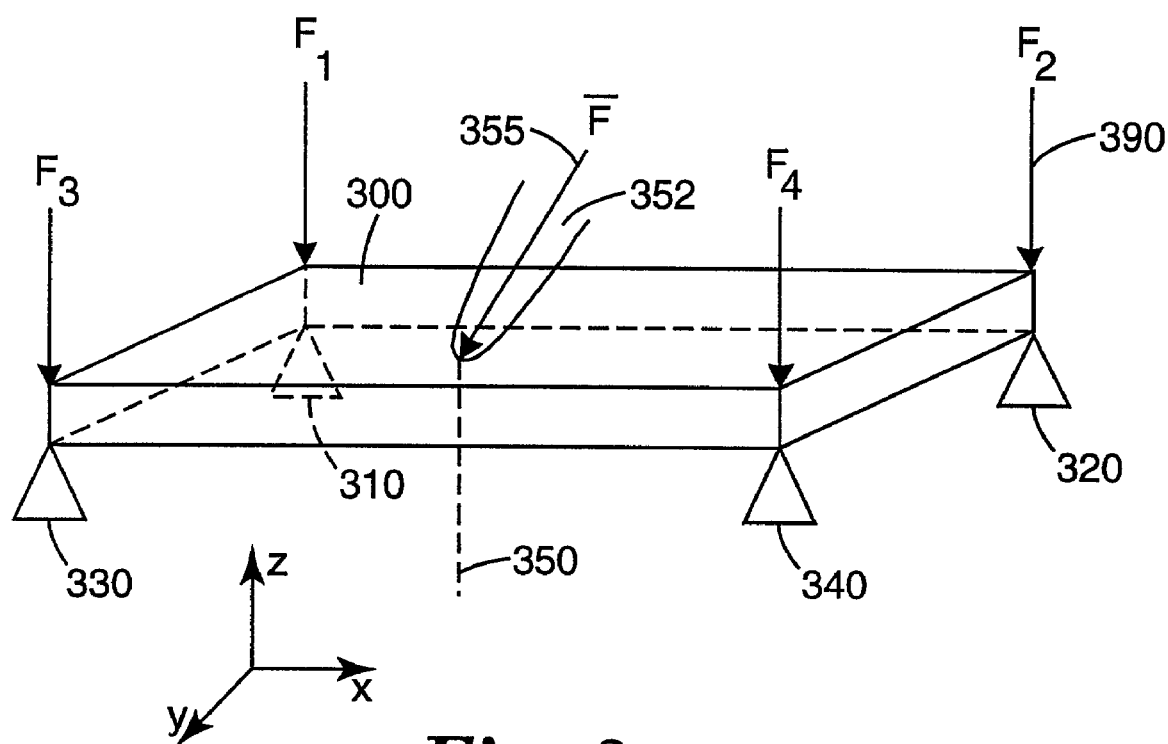
FIG. 3 schematically illustrates a perspective view of a touch screen with force sensors located at the corners of the touch screen in accordance with an embodiment of the invention.

A perspective view of a touch screen is schematically illustrated in FIG. 3. A touch surface 300 is shown disposed proximate to force sensors 310, 320, 330, 340 located at respective corners of the touch surface 300. As a stylus, finger or other touching device 352 presses the touch surface 300, a touch force 355 is exerted upon the touch surface 300 at the touch location 350. The touch force 355 creates forces F1, F2, F3, F4 on the force sensors 310, 320, 330, 340 perpendicular to the touch surface 300. The force sensors 310, 320, 330, 340 may be driven with an alternating electrical signal. The perpendicular forces F1, F2, F3, F4 change the capacitance of the force sensors 310, 320, 330, 340, thereby causing the signal through the force sensors 310, 320, 330, 340 to change. The force responsive signals derived from the force sensors 310, 320, 330, 340 may be used to calculate touch location.

Calculation of the touch location may be performed, for example, using combinations of the force responsive touch sensor signals. The force responsive signals generated by the touch sensors may be used to calculate various touch signals, including the moment about the y-axis, $M_y$, moment about the x-axis, $M_x$, and the total z-direction force, $F_{Tz}$. The coordinates of the touch location may be determined from the touch sensor signals, as provided in Equation 1, assuming a reference point in the center of the touch screen, ideal conditions, with no errors, background fluctuations or disturbances present other than the touch force.

$$X = \frac{M_y}{F_{Tz}}$$
$$Y = \frac{M_x}{F_{Tz}}$$

[1]

where $M_y = (F2+F4)-(F1+F3);$ $M_x = (F1+F2)-(F3+F4);$ and $F_{Tz} = F1+F2+F3+F4.$ The sensor signals are directed to a control system that determines a touch location from the force responsive sensor signals in accordance with Equation 1.

Figure 4A:
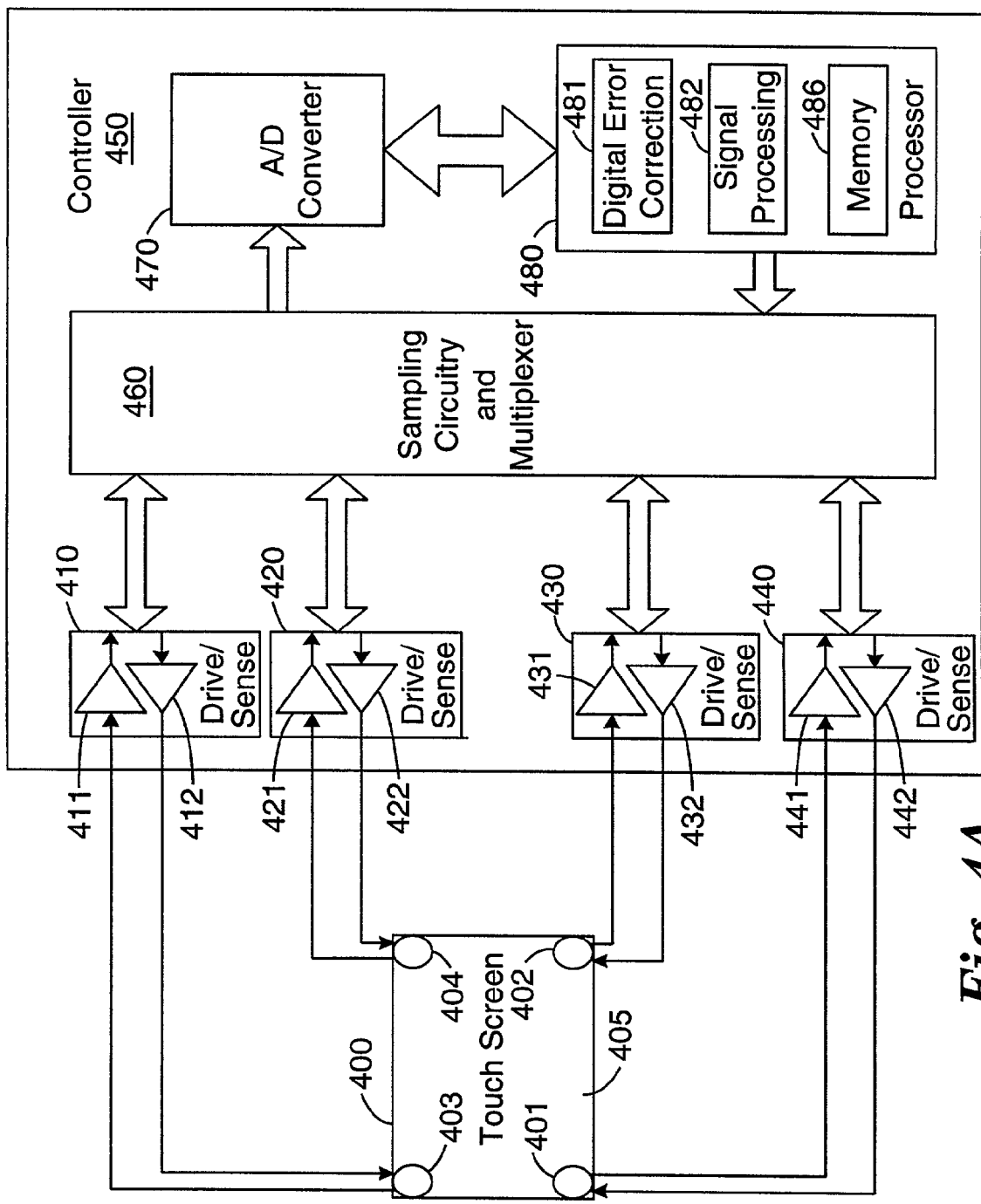
FIGS. 4A and 4B are block diagrams of a touch screen and touch screen control system in accordance with embodiments of the invention.

FIG. 4 schematically illustrates a block diagram of a touch screen 400 and touch screen control system 450 arranged in functional blocks in accordance with the principles of the invention. It will be appreciated that there exist many possible configurations in which these functional blocks may be arranged. The example depicted in FIG. 4 is one possible functional arrangement.

In the exemplary embodiment illustrated in FIG. 4, a touch surface 405 is configured proximate to four force sensors 401, 402, 403, 404 arranged at the respective corners of the touch surface 405. The sensors 401, 402, 403, 404 may be chosen from a variety of sensing technologies, including capacitive, piezoelectric and strain gauge sensors. The sensors 401, 402, 403, 404 measure the force of a touch detected at the sensor locations and are coupled to drive/sense circuitry 410, 420, 430, 440 located within the control system 450. Alternatively, some components of the drive/sense circuitry may be located near the corresponding sensor. An energizing signal developed in the drive circuitry 412, 422, 432, 442 for each sensor is used to energize the sensors 401, 402, 403, 404. Each sensor 401, 402, 403, 404 produces a touch force signal corresponding to a touch force applied to the sensor through the touch surface 405. The touch force signal developed by each sensor 401, 402, 403, 404 is detected by sense circuitry 411, 421, 431, 441 located within the control system 450.

Analog voltages representing the touch force at each sensor location are produced by the sense circuitry 411, 421, 431, 441. The analog voltages are sampled and multiplexed by the sampling circuitry 460 at a rate sufficient to acquire an adequate representation of the force responsive sensor signals for determining touch presence and location. The sampled signals are digitized by an analog to digital (A/D) converter 470. The digitized sensor signals are directed to processor circuitry 480. The processor circuitry 480 performs calculations to determine a touch location. The processor circuitry 480 may also include filtering circuitry 482 for signal conditioning, or may perform signal conditioning through procedure executed on general purpose processor circuitry. Memory circuitry 486 for storage of touch signal values may also be included. If error correction is performed by digital processing, the processor may include error correction circuitry 481 to process the sampled sensor signals, or may correct errors through procedure executed on general purpose processor circuitry. The processor circuitry 480 may also perform a number of additional control system functions, including controlling the touch signal sampling circuitry 460, the multiplexer circuitry 460, and the A/D converter 470.

It may be found advantageous to implement the touch screen control system 450, or its equivalent, on a single mixed-mode integrated circuit chip. In such an implementation, it may be advantageous to replace sampling circuitry 460 and converter 470 with a set of delta-sigma converters operating in parallel, one for each sensor channel.

Figure 4B:
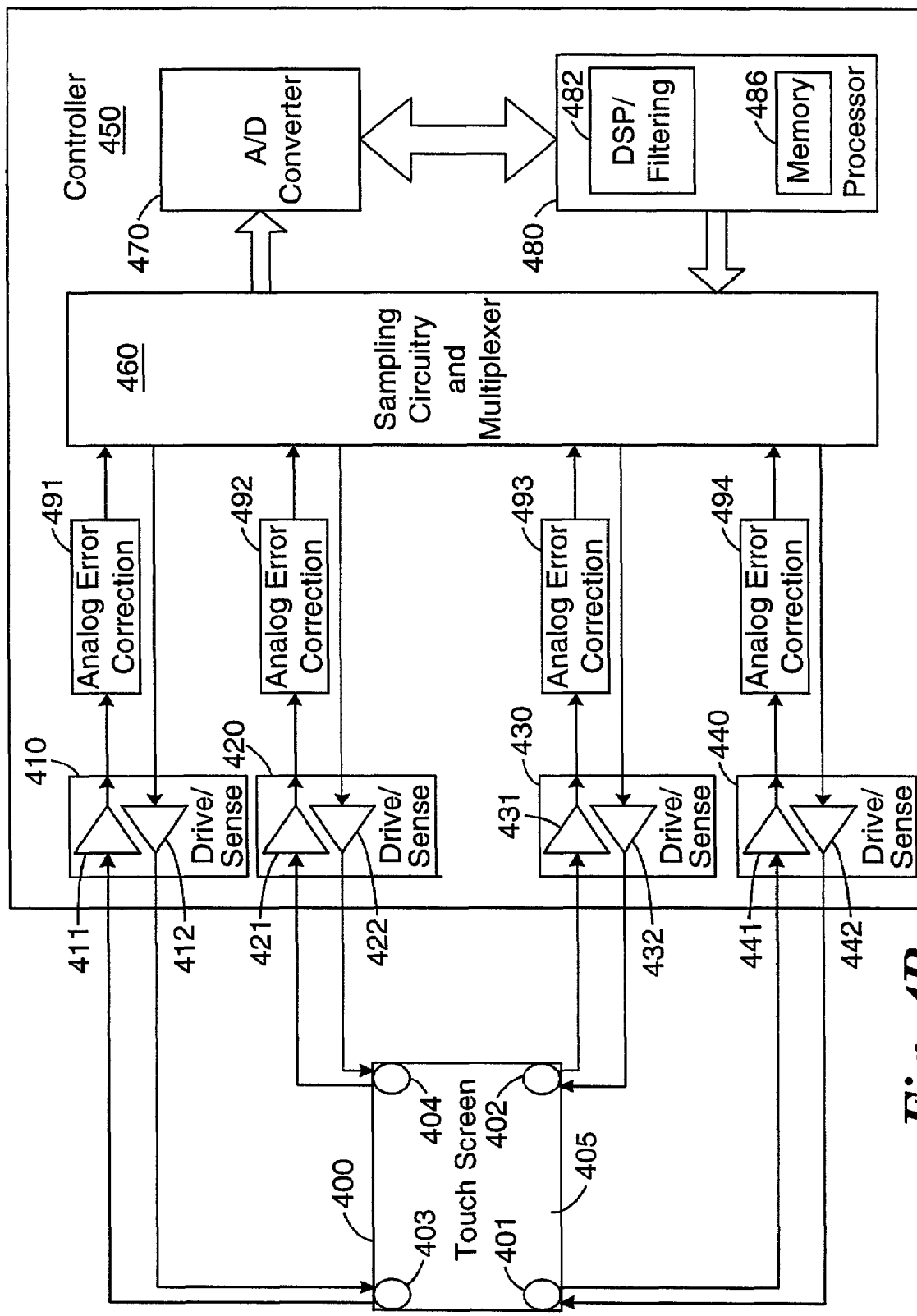

Another exemplary embodiment of the invention, illustrated in FIG. 4B, includes analog circuitry for error correction located within the control system. In this embodiment, error correction is performed by continuous time analog processing. Analog error correction circuitry 491, 492, 493, 494 is coupled to the drive/sense circuitry 410, 420, 430, 440 of each sensor. The sensor signals are processed by the analog correction circuitry 491, 492, 493, 494 to produce corrected sensor signals that may be used for accurate touch location determination.

Imperfections of the kind addressed by the invention may be characterized by features of the error observed in the sensor signals. In particular, a significant fraction of erroneous signal change may develop more than ½ second after the application of a step force. This is a memory effect of far longer duration than the natural periods of elastic vibration typically seen in touch screen construction. While vibrational damping times may be of this order, the observed effects are independent of any vibrational envelopes seen, and are unchanged by manipulations that greatly alter any vibrations present. It is a property of the imperfection in question, however, that it tends to follow a reproducible course for a given force history. It is also a property of the imperfection that in response to a step change in force, it tends to progress monotonically toward an asymptotic value.

One potential source of such errors is imperfect observance of Hooke's law in materials whose elastic behavior is important to the performance of the touch device. Such materials may comprise parts of a force sensor, wherein elastic deformation is related to development of the force-responsive signal. Such materials may or may not comprise obvious and/or deliberate spring elements, or other structures provided to supply controlled elastic behavior.

For instance, in the sensor of FIG. 2, the second conductive element 235 may be of spring metal, and have excellent elastic characteristics. In addition, the end mountings in this design may approximate rigidly clamped end constraints. Some small degree of flexure in the end mountings may occur, however, and failure of such flexure to be elastic may lead to imperfect sensor response. Interconnect 225, for instance, may be a glass-epoxy laminate. There may be small regions of comparatively high stress in interconnect 225 under lands 233, where moment passes out of second conductive element 235 into the end mountings. The material of interconnect 225 may show a degree of viscoelastic strain in response, and this may have some effect on force readings.

Other force sensor designs may be considered, in which force is ascertained by measuring the deflection or deformation of a member made of an elastomer or other polymeric material. Such materials may be prone to substantially delayed deformation and recovery, and sensors directly dependent upon their characteristics may benefit greatly from the method of the invention. Also, some force-sensing touch screen designs may be dependent upon the elastic characteristics of materials used outside the sensors proper. Such designs may also benefit from the method of the invention.

To the extent that an error is reproducible, it may be predictable, and thus correctable. The errors considered here are substantially of this sort, and correction of these predictable errors in one or more sensor signals provides for a more accurate touch location determination. It is to be appreciated that variations of the invention may apply corrections at only certain times, or only in certain regions of a sensor signal. The ratio of error to signal may change with circumstance, and may produce errors of touch location that are far more visible in some circumstances than others. Thus correction may be applied selectively, during times of more objectionable location error.

In general, correction of predictable errors may be accomplished by modeling predictable errors and removing the modeled errors from one or more sensor signals. A sensor signal error may, for example, be represented by any combination of linear or non-linear functions. In one example, the sensor error may be represented as an exponential function with an experimentally determined time constant. In a more general example, the sensor error may be characterized by a weighted sum of several exponential functions, each with an associated time constant. Other characterizations for sensor error may be developed empirically.

Figure 5:
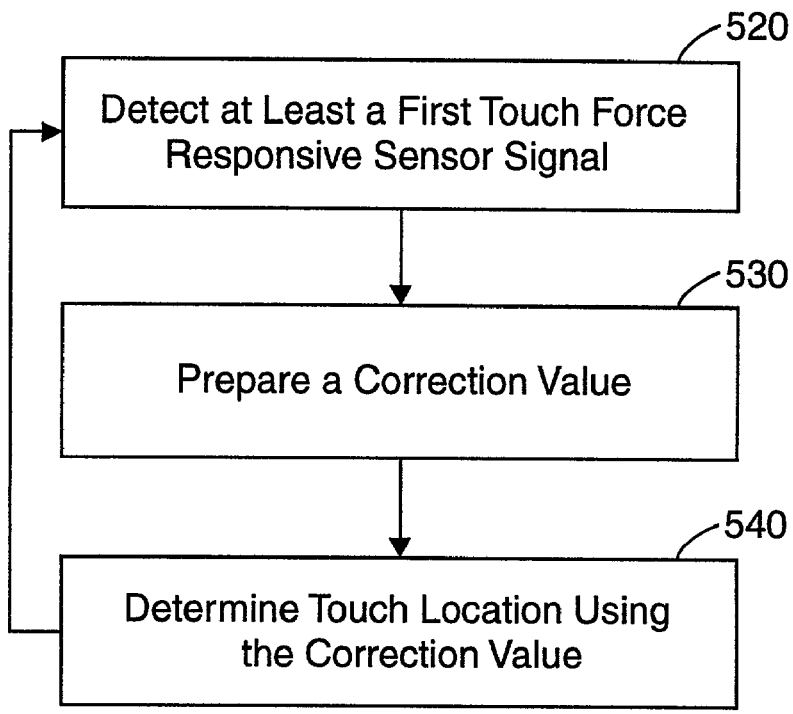
FIG. 5 is a flowchart of a method of correcting sensor signal errors in accordance with an embodiment of the invention.

A method according to the present invention is illustrated, in broad and general terms, by the flowchart of FIG. 5. At least a first touch force responsive sensor signal having a deviation from a proportional response to a touch force caused by viscoelasticity is detected 520. A correction value reflective of the deviation caused by viscoelasticity is prepared 530. Touch location is determined using the correction value 540.

Figure 6:
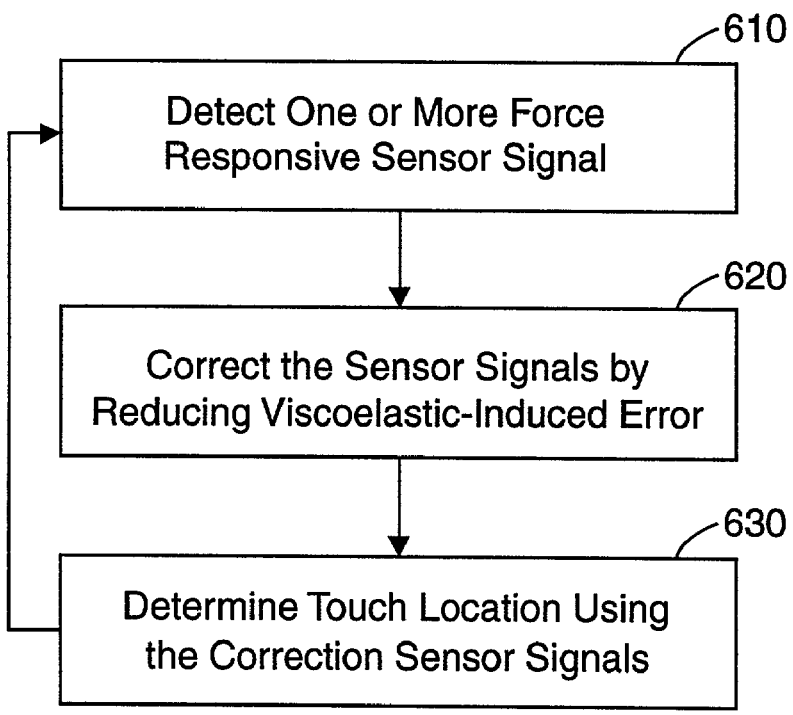
FIG. 6 is a flowchart of a method of correcting sensor signal errors in accordance with another embodiment of the invention.

Another embodiment of the invention is illustrated conceptually in the flowchart of FIG. 6. One or more force responsive sensor signals are detected 610. The detected sensor signals have errors induced by a viscoelastic response. The sensor signals are corrected by reducing the viscoelastic induced errors 620. Touch location is determined using the corrected sensor signals 630.

One observed sensor signal error appears as a predictable memory effect resulting in additional lag time in the touch force transient response. Although the origin of this effect has not been verified experimentally, it may arise from the viscoelastic behavior of a material used in the touch sensor that is subjected to stress when the touch screen is operated. Other mechanical or material related behavior may be the origin of this predictable memory effect. The error caused by this effect is predictable and correctable. Correction of the memory effect error provides a more accurate determination of touch location.

Figure 7:
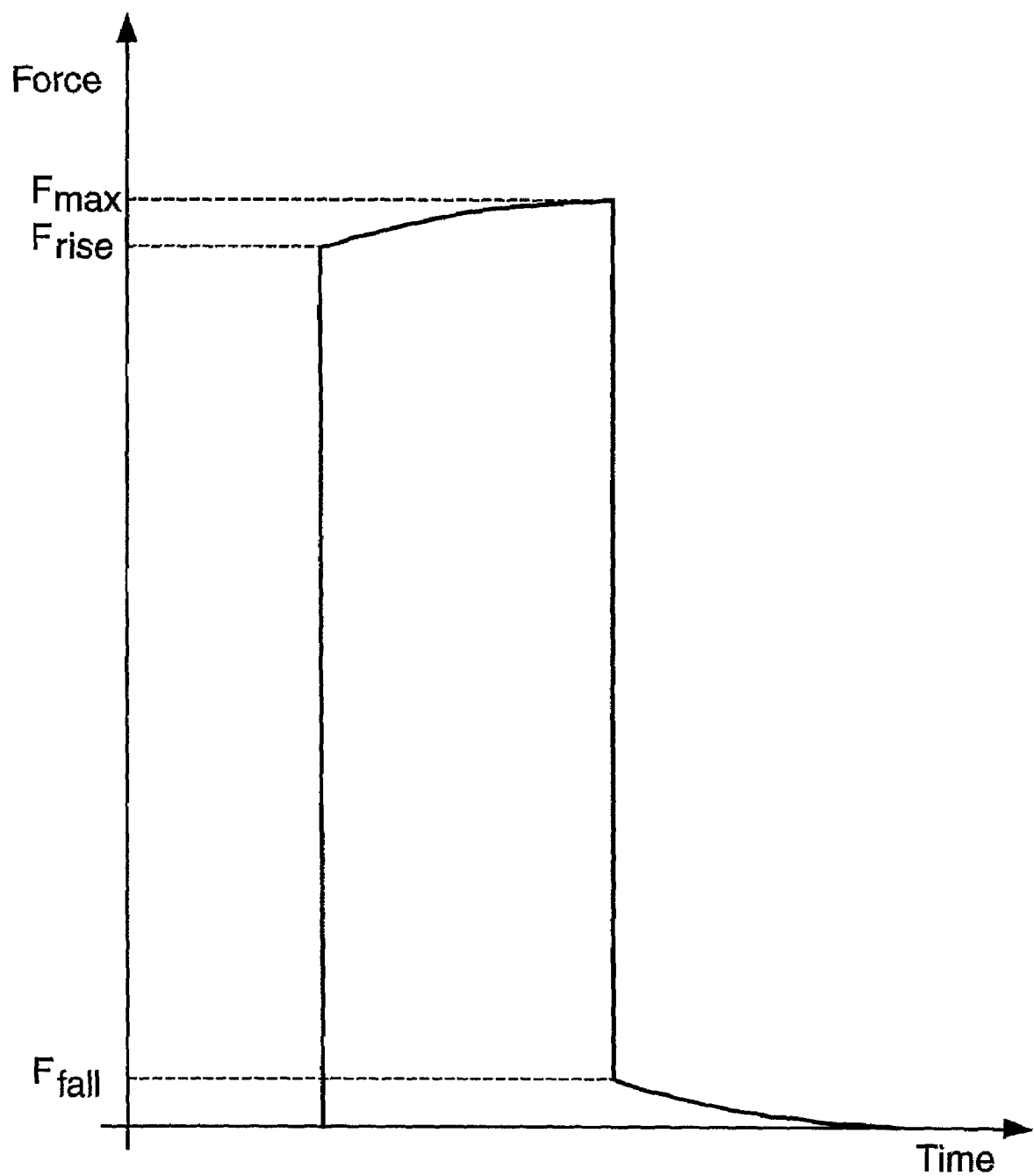
FIG. 7 is a graph of a sensor signal response to a constant touch test force applied for a period of time.

The effect of this error may be described in terms of a sensor response to a step change in an applied test, force as illustrated in FIG. 7. FIG. 7 illustrates a force signal that ultimately increases to a maximum magnitude of $F_{max}$. If the force is abruptly applied, the immediate sensor response is a magnitude of $F_{rise}$, with a gradual rise to $F_{max}$ over a period of time. When the force is removed from the sensor, the sensor output immediately drops to $F_{fall}$, with a gradual decrease to zero. The lag time observable at the leading and trailing edges of the sensor signal may be characterized mathematically. In one example, the errors in the transient response of the sensor signal observable at both the leading and trailing edges may be characterized by an exponential function with an experimentally determined time constant.

One difficulty arising from errors caused by the memory effect transient response of the sensor signal described above may be observed when two touches are made in rapid succession. Consider the situation where a first touch is made to a first touch screen location followed closely by a second touch made to a second touch screen location area. In this situation, the lag time in the sensor response at the falling edge of the signal generated by the first touch may cause inaccuracy in the touch location determination of the second touch.

Assuming touch sensors located at each corner of the touch screen, memory effect transient response errors may be most problematic when a heavy and prolonged touch is applied to one touch screen corner followed by an immediate light touch to an opposing corner. Because the sensors are still producing a small output due to the first heavy touch, determination of the touch location for the light touch may be inaccurate. In this situation, the sensor located nearest the preceding heavy touch will produce the largest error signal. When the following light touch is applied, the small phantom force apparent at the sensor in the far corner will cause the location reported for the light touch to be displaced toward that far corner. If the light touch is then continued, for example, as in a streaming touch, the reported location will slowly approach the actual touch point, as the memory of the preceding touch fades in the far sensor.

The inaccuracy in the touch location of the light touch at an opposing corner may be high because errors in sensors at locations remote from a given touch have the greatest effect on the accuracy of the touch location determination. Also, the greater force of the heavy touch may make the error signal attributable to the memory effect error of the heavy touch large in comparison to the touch signal for the light touch. A need exists, therefore, for a more complete correction of the signal errors associated with predictable errors, such as the memory effect error described above.

The time course and relative magnitude of the sensor signal memory effect errors illustrated in the graph of FIG. 7 have been observed to be largely independent of the absolute magnitude of the force step. Further, the lag time in both the rising and falling edges of a sensor signal may be reasonably characterized by an exponential function with a single time constant. These observations are suggestive of a model of sensor behavior wherein the sensor signal is augmented by an error comprising a little bit of a single-pole, very low-pass filtering of that same sensor signal. Correction of the memory effect transient response error based on this model by application of the methods of the present invention has been proven empirically to be successful.

An error correction procedure of the present invention involves characterizing an error of the touch sensor signal and subtracting the characterized error from the signal. A method of the present invention may be applied with either continuous time analog processing, or with discrete time digital processing performed by components 491–494 or by component 481 illustrated in FIGS. 4A and 4B, respectively.

Figure 8:
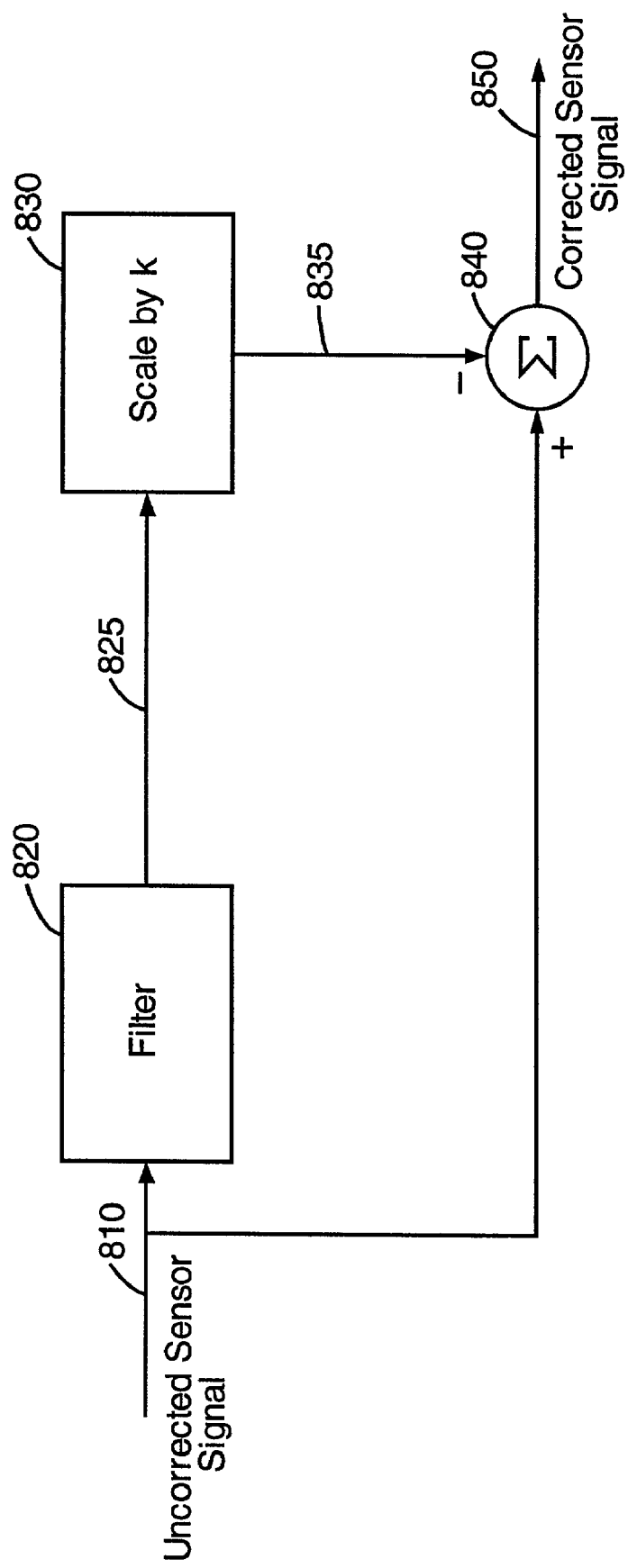
FIG. 8 is a diagram of an error correction procedure for memory effect transient response errors in accordance with an embodiment of the invention.

An error correction procedure according to the present invention is illustrated in the diagram of FIG. 8 and the corresponding graphs of FIGS. 9–12. As illustrated in FIG. 8, the sensor signal 810 is applied to a first order low pass filter 820 with predetermined gain and predetermined time constant. The output 825 of the filter is scaled 830 by an appropriate factor k. The output 835 of the scaling function is subtracted 840 from the uncorrected sensor signal 810 to produce the corrected sensor signal 850.

Figure 9:
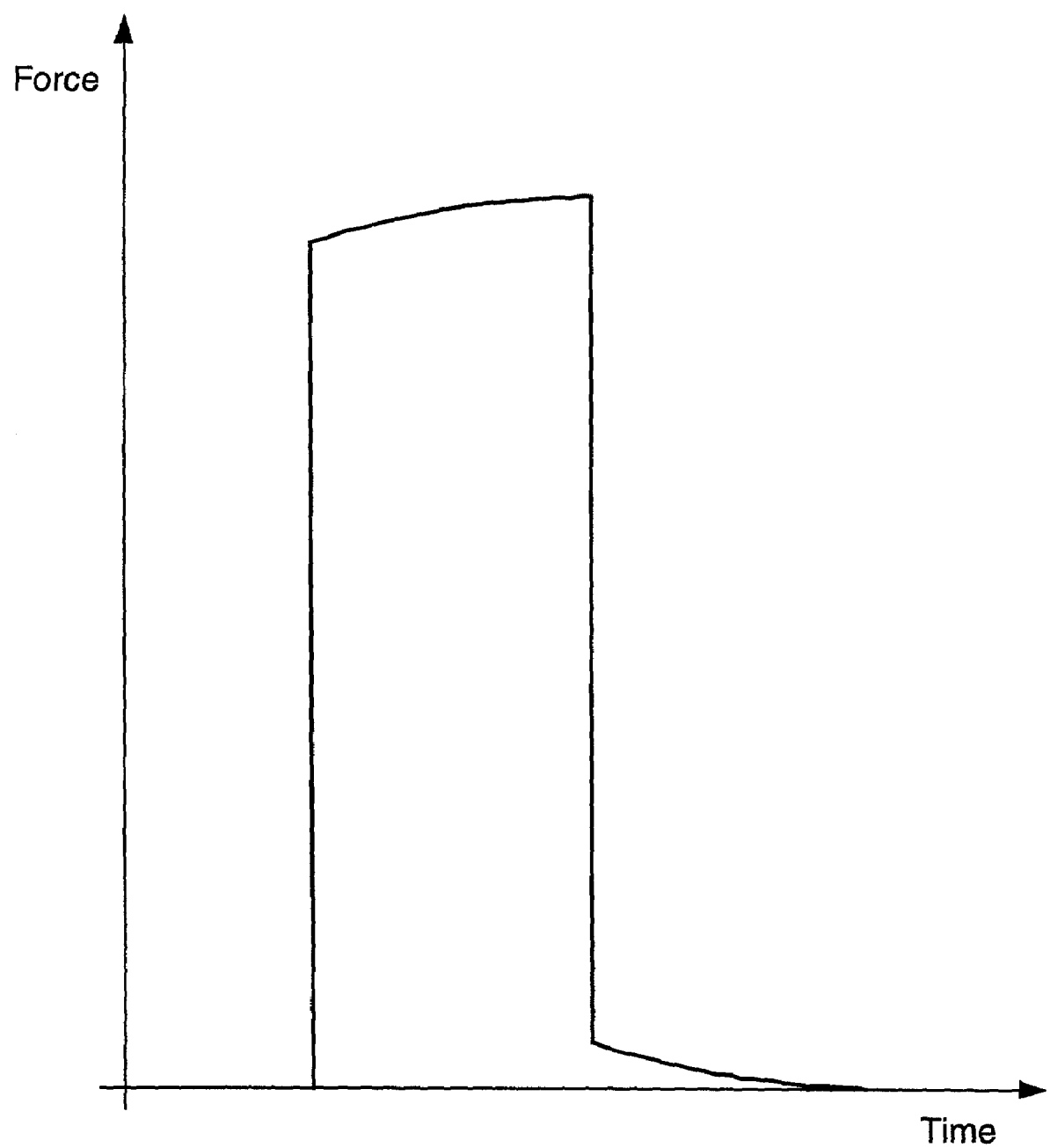
FIG. 9 is a graph characterizing an uncorrected sensor signal response to a touch test force.
Figure 10:
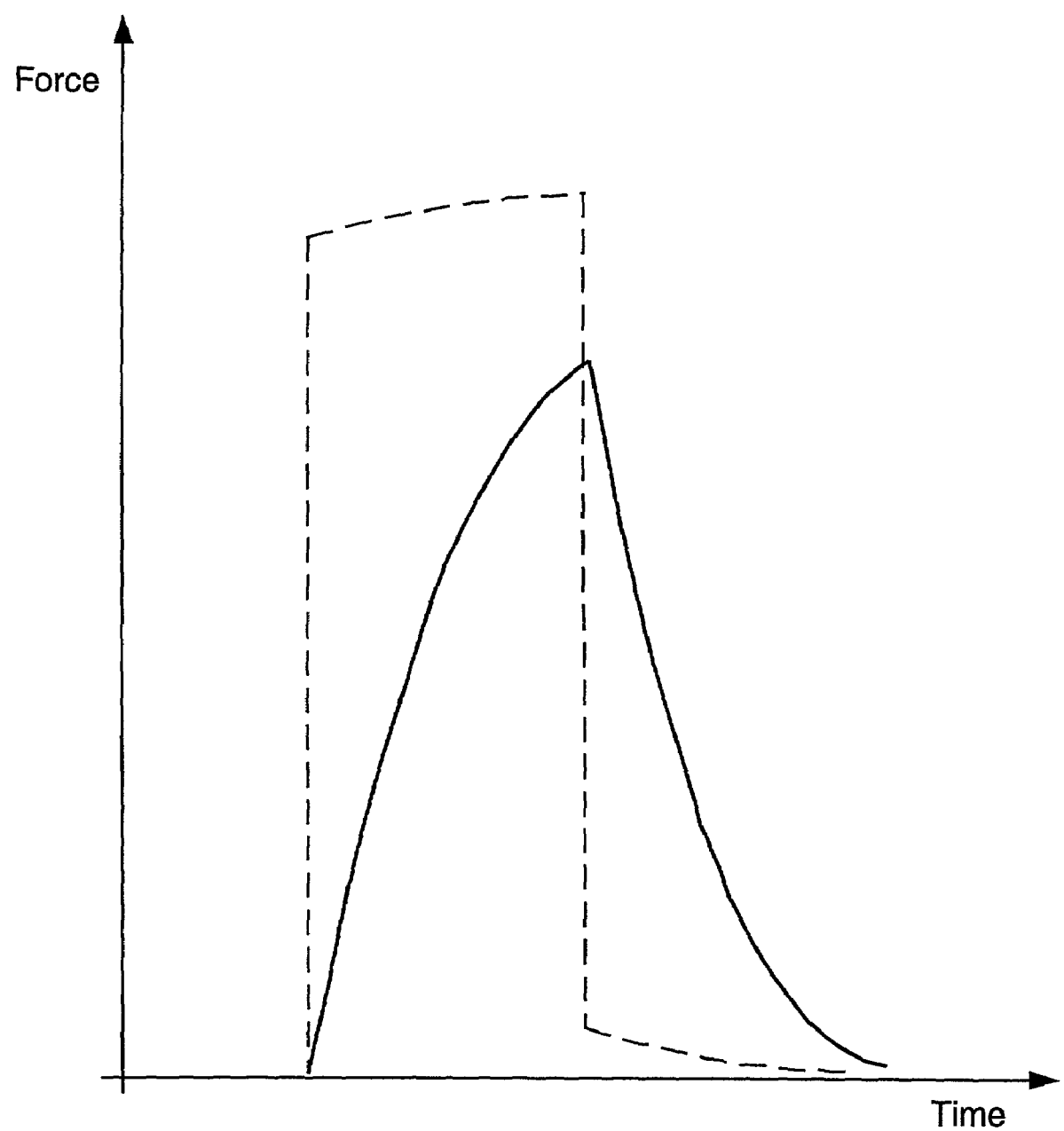
FIG. 10 is a graph characterizing an intermediate step of a sensor signal error correction procedure in accordance with an embodiment of the invention.
Figure 11:
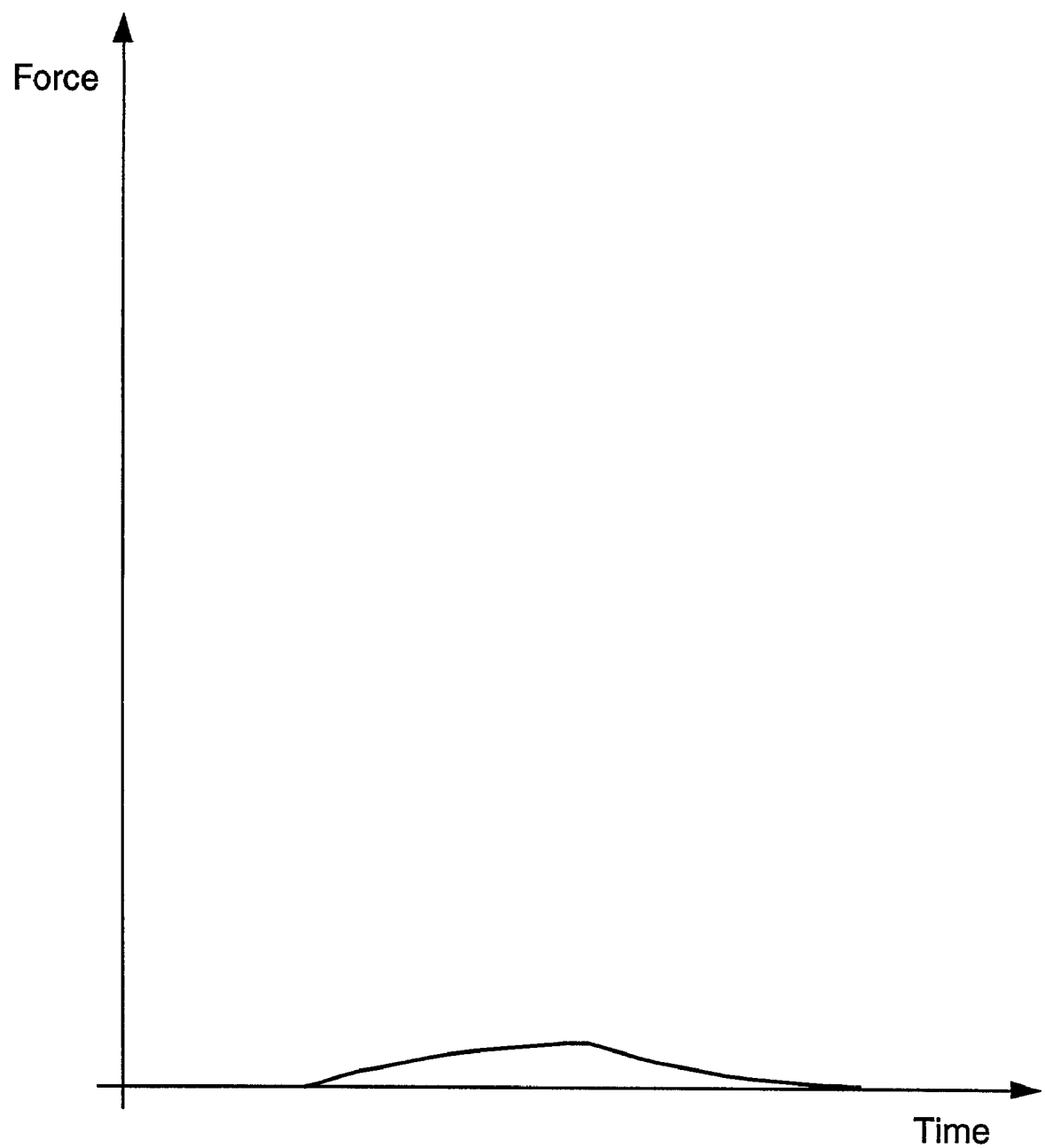
FIG. 11 is a graph characterizing a sensor signal correction factor in accordance with an embodiment of the invention.
Figure 12:
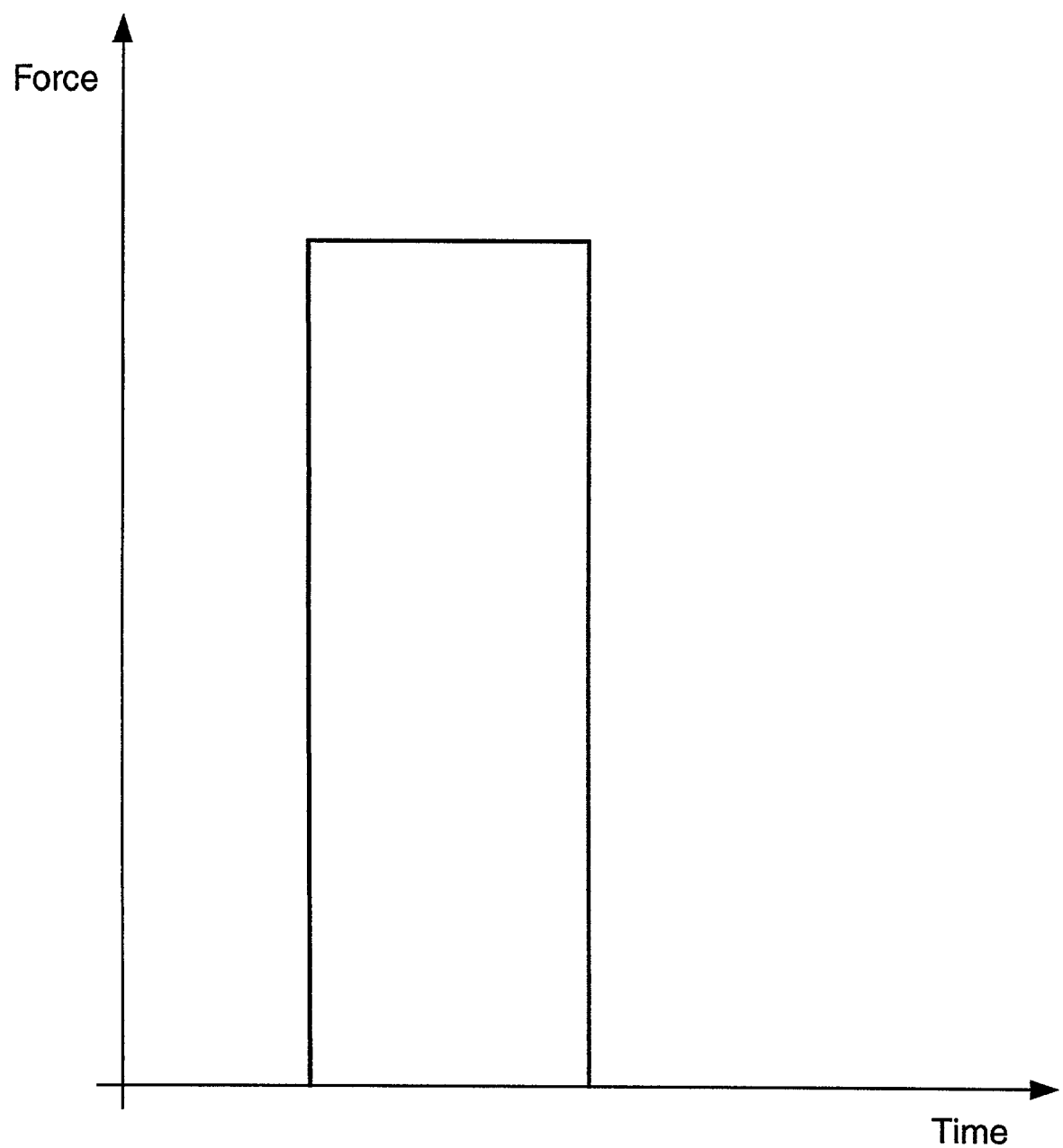
FIG. 12 is a depiction of a corrected sensor signal in accordance with an embodiment of the invention.

FIGS. 9–12 graphically illustrate the result of the above procedure applied to a particular touch sensor signal. FIG. 9 is a graph of an uncorrected sensor signal representing the sensor response to a constant magnitude step force of 2-second duration. The transient response detected at the sensor produces errors at the rising and falling edges of the sensor signal. In accordance with a method of the present invention, an uncorrected sensor signal is applied to a first order low pass filter. In this example, the low pass filter has unity gain and a time constant of 1 second, although other parameters may be selected depending upon the characteristics of the error being corrected. The filter output is illustrated in the graph of FIG. 10. The output of the filter is scaled by an appropriate constant to produce an error correction factor. In this example, a scale constant of 0.01 is applied. The result of scaling is illustrated in the graph of FIG. 11. Finally, as illustrated in FIG. 12, the correction factor is subtracted from the uncorrected sensor signal to produce the corrected sensor signal.

While FIGS. 9–12 depict only one particular test force, it is found that when the parameters of the procedure as discussed are adjusted to give best correction for this case, they also give excellent correction for all test forces and finger touches applied.

More generally, the method of the invention may be applied to other sensors with different memory characteristics, such as those with elastomeric or polymeric spring elements, or to piezoelectric or other force sensors with memory characteristics. For example, such sensors may benefit from corrections generated from an appropriately weighted sum of several corrections, each produced by a first order filter with a different time constant. Other functional forms for generation of the correction values may also be developed empirically. These may be of either linear or non-linear type.

We now review a method of the invention expressed in a more mathematical notation:

Correction elements may be generated in a first step. These may comprise one or more linear filterings of an uncorrected signal $f_s(t)$ from particular sensor s. The filter functions applied may generally respond on a time scale that is distinctly longer than that of the primary mechanical and electronic responses of the system. Each of n filters may have an impulse response $I_i(t)$, where i ranges from 1 to n. The correction elements then comprise the n values $f_s(t)*I_i(t)$, where * denotes the convolution operator.

A correction signal $f_{Cs}(t)$ may be generated in a second step. This may comprise an appropriate linear weighting of the correction elements generated in the first step. The correction signal may then be represented by the following:

$$f_{Cs}(t) = \sum_{i=1}^{n} k_i f_s(t)*I_i(t). \qquad [2]$$

A corrected sensor output $f_{SCs}(t)$ may then be generated in a third step in accordance with:

$$f_{SCs}(t) = f_s(t) - f_{Cs}(t) \qquad [3]$$

or more directly as:

$$f_{SCs}(t) = f_s(t) - \sum_{i=1}^{n} k_i f_s(t)*I_i(t) \qquad [4]$$

In particular embodiments, it may be sufficient to confine the filters to first order exponential filters with impulse responses of the form:

$$I_i(t) = \frac{1}{\tau_i} e^{\frac{-t}{\tau_i}}$$

for $t \geq 0$, and $I_i(t)=0$ for $t<0$.

In a specific embodiment suitable for the preferred capacitive force sensor, it may be sufficient to have n=1, with the single time constant τ set to 1 second, and the single weighting k set to 0.01. In other embodiments suitable for other designs of force-sensing touch screens, it may be desirable to use n>1, with distinct time constants for each filter.

The actual sensor signal may be viewed as a sum of the desired force-proportional signal, plus an error component that is the result of a certain error operator applied to the desired signal. It may be noted that when the total error superimposed on the desired sensor signal is relatively small, as in the case portrayed in FIGS. 7–9, accurate correction may be achieved by applying that same error operator to the distorted signal as measured, and the result subtracted from the distorted signal to give a corrected one. Since the error operator being applied to generate the correction is being applied to the error in the measured signal as well as to the desired component, the result will not perfectly match the original error, however. This may become important, when sensors are used in which the errors to be corrected are large. This problem may be addressed by adjusting the impulse response of the corrective filtering, either by employing additional time constants, or by more general means, as through an FIR filter with appropriately weighted taps.

The application of Equation 2 to $f_s(t)$ defines an error-estimating operator. This is a linear, time-invariant operator, or LTI operator, generating $f_{Cs}(t)$ from $f_s(t)$. Similarly, the application of both Equation 4 defines a corrected-signal operator. This is an LTI operator generating $f_{SCs}(t)$ from $f_s(t)$. Thus, correction may be viewed as computation of error followed by subtraction of error, such as by applying an LTI error-estimation operator to the signal to be corrected to get a correction value, then subtracting that correction value from the signal to form the corrected signal. Alternatively, correction may be viewed as a signal substitution, such as by applying an LTI corrected-signal operator to the signal to be corrected to get the corrected signal.

The sensor signal, including an error component of the sensor signal as described herein, is noted to have characteristics substantially compatible with its representation as the result of an LTI sensor-value operator applied to the true sensor force as a function of time. In other words, the sensor behavior may substantially modeled in this way. Such a result may have its origins in a physical effect known as linear viscoelasticity. It is thus desired that the corrected-signal operator, such as that defined above for $f_{SCs}(t)$, approximate the mathematical inverse of the sensor-value operator as closely as possible.

Because the operations involved in sensor signal correction may be linear in the above sense, it may be possible to apply them as effectively to sensor signals derived as linear combinations of other sensor signals, as to the original signal arising in each separate sensor. For instance, it will be seen that the result of applying the method of Equation 4 to four uncorrected corner sensor signals, followed by computation of force and moments as seen in Equation 1, yields the same values as computation of force and moments from the four uncorrected corner sensor signals, followed by the application of the method of Equation 4 to yield corrected force and moment values. In addition to such a rearrangements of the order of computation, many other variations of procedure will be evident to one of ordinary skill in the art. For instance, expected X and Y errors of touch position may be estimated, by tabular or other means, from the sensor signals and a correction value derived therefrom taken together. X and Y values computed from uncorrected signals may then be corrected by subtracting the expected X and Y errors. All such variations are substantially equivalent in motive and effect to the method of the invention, and are within the scope of the invention.

Figure 13:
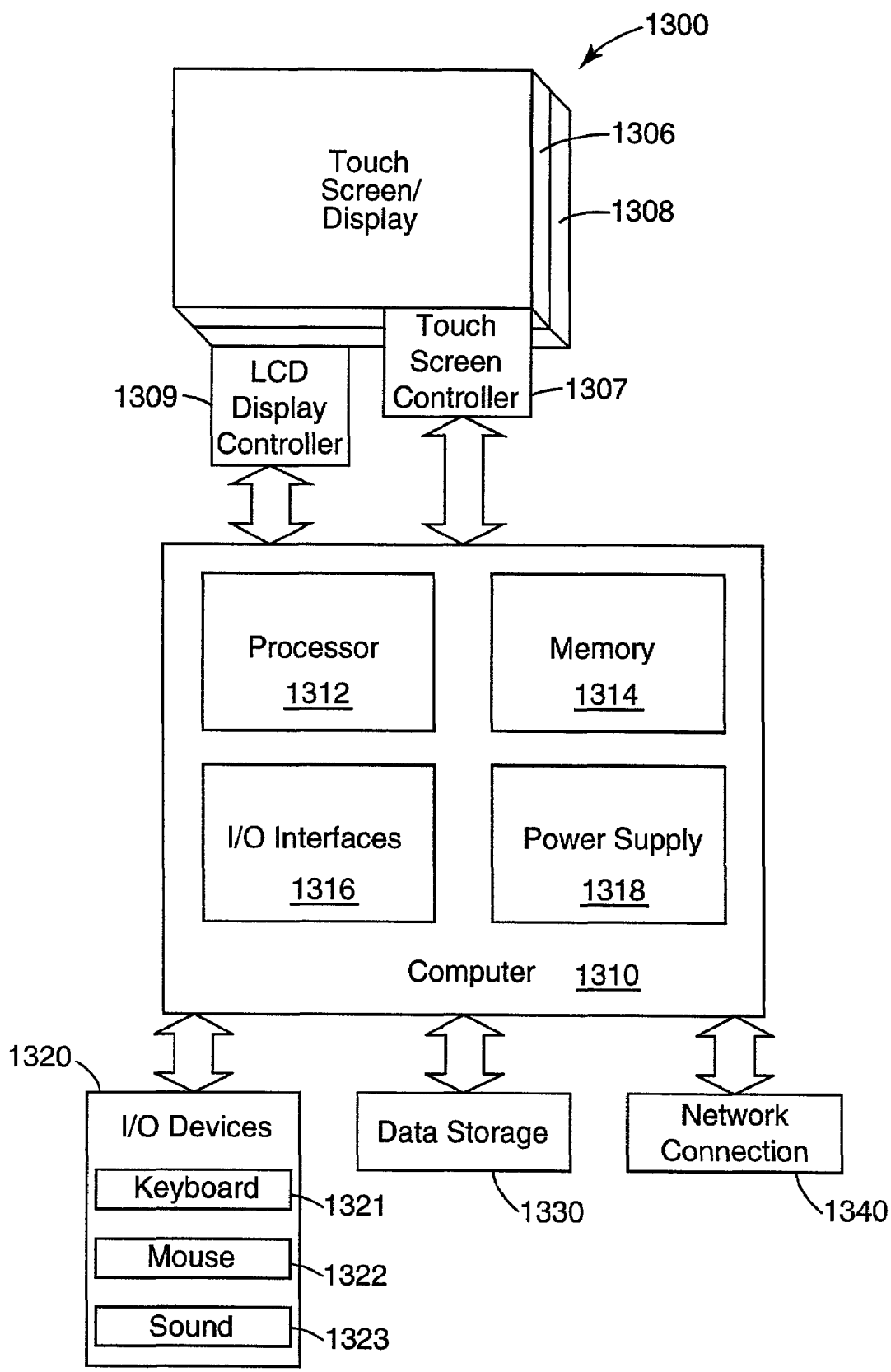
FIG. 13 is a block diagram of a data processing system using a touch sensing interface in accordance with an embodiment of the invention.

A touch screen of the present invention may be advantageously implemented in various data processing systems. Turning now to FIG. 13, a block diagram of a data processing system 1300 using an integrated touch screen and display is shown in accordance with an embodiment of the present invention. The system 1300 uses a transparent touch screen 1306 arranged above a display 1308 suitable for data processing applications, such as an LCD display. Other displays may be used, such as a CRT display, plasma display, LED display or the like. The display 1308 may require display control system circuitry 1309 for interfacing the display with the data processor computer 1310. A touch screen control system 1307 includes the drive/sense circuitry described above in addition to a touch screen control system processor according to an embodiment of the present invention.

The data processor 1310 may include various components depending upon the computer system application. For example, the data processor may include a microprocessor 1312, various types of memory circuitry 1314, a power supply 1318 and one or more input/output interfaces 1316. The input/output interfaces 1316 allow the data processing system to connect to any number of peripheral I/O devices 1320 such as keyboards 1321, pointing devices 1322, and sound devices 1323, including microphone and speakers. The data processing system may additionally include a mass data storage device 1330, for example, a hard disk drive or CD ROM, and may be networked to other data processing systems through a physical or wireless network connection 1340.

Figure 14:
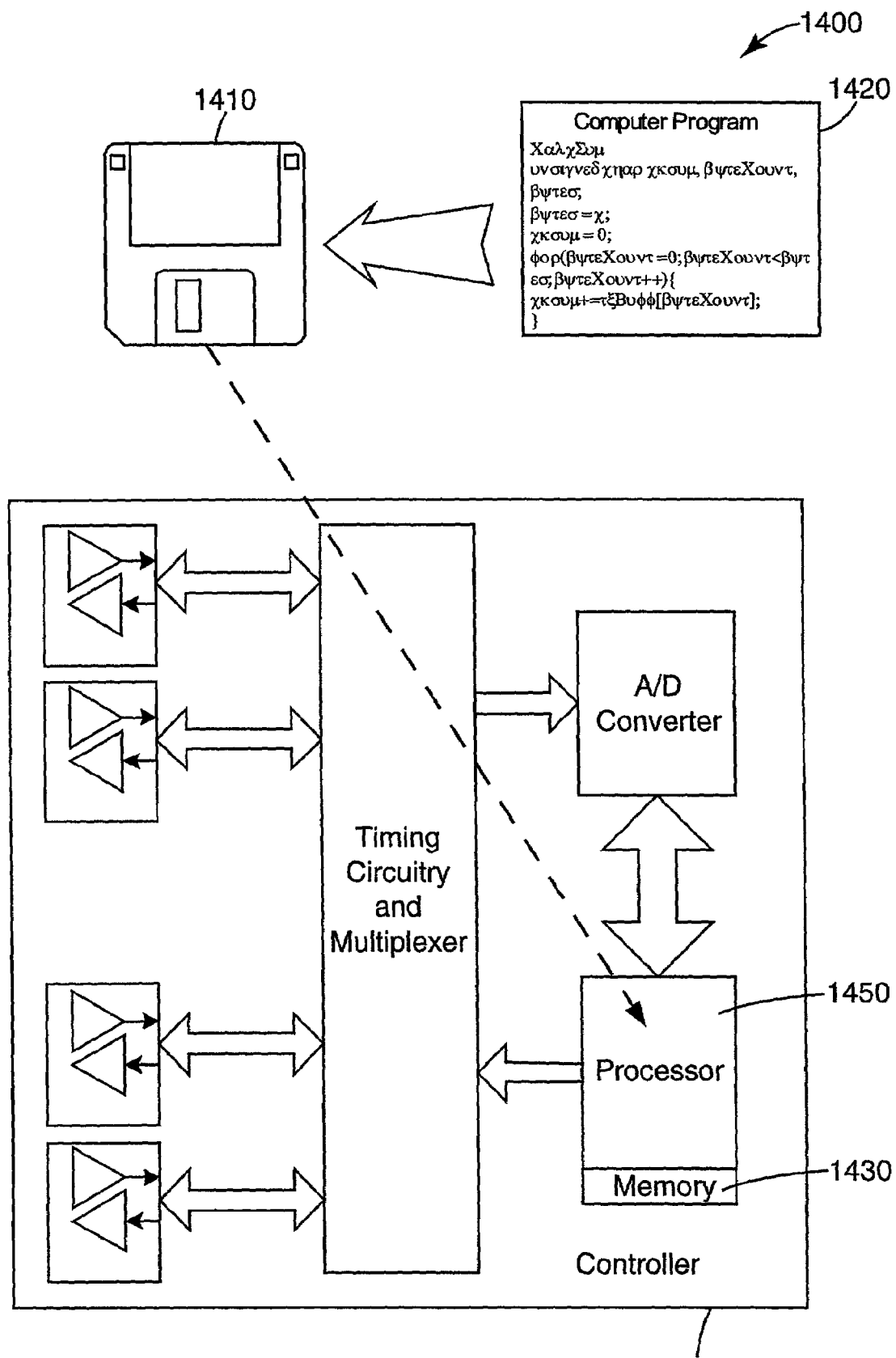
FIG. 14 illustrates a touch screen controller in accordance with an embodiment of the invention.

FIG. 14 illustrates a touch screen system 1400 in accordance with the present invention, wherein the processes illustrated with reference to FIGS. 1–12 may be tangibly embodied in a computer-readable medium or carrier, e.g. one or more of the fixed and/or removable data storage devices 1410 illustrated in FIG. 14, or other data storage or data communications devices. One or more computer programs 1420 expressing the processes embodied on the removable data storage devices 1410 may be loaded into various memory elements 1430 located within the touch screen control system 1440 to configure the touch screen system 1400 for operation in accordance with the invention. The computer programs 1420 comprise instructions which, when read and executed by the touch screen system processor 1450 of FIG. 14, cause the touch screen system 1400 to perform the steps necessary to execute the steps or elements of the present invention.

An error correction method and system in accordance with the principles of the present invention provides a more accurate determination of a touch location on a touch screen. One method for timing the touch location calculation is described in the commonly owned U.S. patent application Ser. No. 10/140,209 entitled "Method for Improving Positioned Accuracy for a Determined Touch Input,", which is hereby incorporated herein by reference in its entirety. According to this method, touch location may be calculated from data gathered at a preferred time within the touch signal time profile.

Another method for improving touch location accuracy is described in the commonly owned U.S. patent application Ser. No. 10/142,118 entitled "Improved Baselining Techniques in Force-Based Touch Panel Systems," which is hereby incorporated herein by reference in its entirety. One or more reference levels may be identified for a touch signal. The reference levels may compensate for various conditions affecting the touch screen at the time of the touch. Touch location accuracy may be enhanced using one or more of the identified touch signal reference levels for determining the touch location.

A touch sensing approach incorporating the error correction method described herein is well-suited for use with various data processing systems, including personal data assistants (PDAs), electronic instruments, cell phones, and computers, including handheld, laptop and desktop computers.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and processes.

What is claimed is:

1. A method for determining a touch location on a touch screen, comprising:

detecting one or more touch force responsive sensor signals characterized by an initial response to a step change in a touch force, the initial response being augmented by a monotonic increase in the sensor signals over a period of time;

preparing a correction value reflective of the monotonic increase in the sensor signals; and determining the touch location using the correction value;

wherein the monotonic increase tends to an asymptotic value according to a weighted sum of one or more exponentially decreasing functions of time while a constant touch force is maintained, the one or more functions characterized by one or more distinct time constants, and preparing the correction value further comprises modeling the difference between the monotonically increasing response and the asymptotic value according to the weighted sum of the one or more exponentially decreasing functions of time.

2. The method of claim 1, wherein the monotonic increase differs significantly from the asymptotic value for more than one-half second after the application of the step change in the touch force.

3. The method of claim 1, wherein determining the touch location using the correction value comprises:
   using the correction value to correct a first sensor signal; and
   determining the touch location using the corrected first sensor signal.

4. The method of claim 3, wherein the first sensor signal is a derived sensor signal comprising a weighted sum of two or more signals.

5. The method of claim 3, wherein using the correction value to correct the first sensor signal comprises subtracting the correction value form the first sensor signal.

6. The method of claim 3, wherein using the correction value to correct the first sensor signal comprises substituting the correction value for a signal from which the first sensor signal is derived.

7. The method of claim 1, wherein preparing a correction value comprises applying a linear, time-invariant operator to a first weighted sum that includes at least one of the one or more sensor signals.

8. The method of claim 7, wherein determining touch location using the correction value comprises:
   substituting a correction value for the first weighted sum to form a corrected signal; and
   determining the touch location using the corrected sensor signal.

9. The method of claim 8, wherein applying the linear, time-invariant operator comprises applying an operator mathematically equivalent to subtracting a weighted sum of one or more first-order low-pass filtrations of the first weighted sum from the first weighted sum.

10. The method of claim 1, wherein determining the touch location using the correction values comprises:
    subtracting the correction value from at least one sensor signal to form a corrected sensor signal; and
    determining the touch location using the corrected sensor signal.

11. The method of claim 10, wherein applying the linear, time-invariant operator comprises taking a second weighted sum of one or more first-order low-pass filtrations of the first weighted sum.

12. A method for determining a touch location on a touch screen using a plurality of touch sensors mechanically coupled to a touch surface, comprising:
    detecting at least a first touch force responsive sensor signal having a deviation from a proportional response to a touch force caused by viscoelasticity;
    preparing a correction value reflective of the deviation caused by viscoelasticity by modeling the deviation as a weighted sum of one or more exponentially decreasing functions of time and preparing a correction value reflective of the deviation so modeled; and
    determining the touch location using the correction value.

13. The method of claim 12, wherein the viscoelasticity is predominantly a linear viscoelasticity.

14. The method of claim 12, wherein the one or more exponentially decreasing functions is characterized by one or more distinct time constants.

15. The method of claim 12, wherein the deviation remains significant for more than one-half second after removal of the touch force.

16. The method of claim 12, wherein determining the touch location using the correction value comprises:
    using the correction value to correct at least a second sensor signal; and
    determining the touch location using the corrected second sensor signal.

17. The method of claim 16, wherein the second sensor signal comprises a weighted sum of sensor signals.

18. The method of claim 16, wherein using the correction value to correct the second sensor signal comprises subtracting the correction value from the second sensor signal.

19. The method of claim 16, wherein using the correction value to correct the second sensor signal comprises substituting the correction value for a signal from which it is derived.

20. The method of claim 12, wherein preparing a correction value comprises applying a linear, time invariant operator to a first weighted sum including the first sensor signal.

21. The method of claim 20, wherein determining the touch location using the correction value comprises: subtracting the correction value from a second sensor signal to form a corrected second sensor signal; and determining the touch location using the corrected second sensor signal.

22. The method of claim 21, wherein applying the linear, time-invariant operator comprises taking a second weighted sum of one or more first-order low-pass filtrations of the first weighted sum.

23. The method of claim 20, wherein determining the touch location using the correction value comprises: substituting the correction value for the first weighted sum to form a corrected second sensor signal; and determining the touch location using the corrected second sensor signal.

24. The method of claim 23, wherein applying the linear, time-invariant operator comprises applying an operator mathematically equivalent to subtracting a second weighted sum of one or more first-order low-pass filtrations of the first weighted sum from the first weighted sum.

25. A method for determining a touch location on a touch screen using a plurality of touch sensors mechanically coupled to a touch surface, comprising:
    detecting one or more force responsive sensor signals having errors induced by a viscoelastic effect;
    correcting the one or more sensor signals by characterizing the errors in the one or more sensor signals and reducing the viscoelastic induced errors; and
    determining the touch location using the corrected sensor signals;
    wherein characterizing the errors in the one or more sensor signals comprises characterizing the errors using an exponential function.

26. The method of claim 25, wherein detecting the one or more force responsive sensor signals comprises detecting one or more sensor signals having a predictable error.

27. The method of claim 25, wherein the exponential function used to characterize the errors in the one or more sensor signals has an experimentally determined time constant.

28. The method of claim 25, wherein characterizing the errors in the one or more sensor signals comprises characterizing the errors using a weighted sum of several exponential functions.

29. The method of claim 25, wherein correcting the one or more sensor signals comprises:
    filtering uncorrected sensor signals to produce filtered sensor signals;
    scaling the filtered sensor signals by a scaling factor to produce a correction factor; and
    subtracting the correction factor from the uncorrected sensor signals.

30. The method of claim 29, wherein filtering the uncorrected sensor signals comprises a first order filtering of the uncorrected sensor signals.

31. The method of claim 29, wherein filtering the uncorrected sensor signals comprises filtering the uncorrected sensor signals using a predetermined time constant.

32. The method of claim 25, wherein correcting the one or more sensor signals comprises using continuous time analog processing to correct the one or more sensor signals.

33. The method of claim 25, wherein correcting the one or more sensors signals comprises using discrete time digital processing to correct each sensor signal.

34. A touch screen system, comprising:
a touch surface;
a plurality of touch sensors, the touch sensors physically coupled to the touch surface and producing sensor signals in response to a touch force applied to the touch surface; and
a control system, coupled to the touch sensors, the control system configured to detect one or more sensor signals having one or more errors induced by a viscoelastic effect, correct the one or more sensor signals by reducing the viscoelastic induced errors, and determine a touch location using the corrected sensor signals;
wherein the control system is configured to characterize the errors in the one or more sensor signals as an exponential function.

35. The system of claim 34, wherein the touch sensors comprise capacitive force sensors.

36. The system of claim 34, wherein the control system is configured to reduce the errors in the one or more sensor signals.

37. The system of claim 34, wherein the control system is configured to characterize the errors in the one or more sensor signals as a weighted sum of several exponential functions.

38. The system of claim 34, wherein the control system comprises a processor for correcting the one or more sensor signals having the errors, and determining the touch location using the corrected sensor signals.

39. The system of claim 34, wherein the control system further comprises a digital processing circuit configured to correct the one or more sensor signals.

40. The system of claim 34, wherein the control system further comprises:
a filter circuit for filtering the uncorrected sensor signal;
a scaling circuit, coupled to the filter circuit, for scaling an output of the filter circuit to produce correction factors; and
a summing circuit for subtracting the correction factors from the uncorrected sensor signals to produce the corrected sensor signals.

41. The method of claim 40, wherein the filter circuit has a predetermined gain.

42. The system of claim 34, wherein the control system further comprises analog circuitry configured to correct the one or more sensor signals.

43. A touch screen display system, comprising: a touch screen system, including:
a touch surface;
a plurality of touch sensors, the touch sensors physically coupled to the touch surface and producing sensor signals in response to a touch force applied to the touch surface;
a control system, coupled to the touch sensors, the control system configured to detect one or more sensor signals having errors induced by a viscoelastic effect, correct the one or more sensor signals by reducing the viscoelastic induced errors, and determine a touch location using the corrected sensor signals, the control system characterizing the errors in the one or more sensor signals using an exponential function; and
a display for displaying information through the touch screen system.

44. The system of claim 43, wherein the display comprises a liquid crystal display, a light emitting diode display, a plasma display or a cathode ray tube display.

45. The system of claim 43, wherein the control system is configured to reduce the errors in the sensor signal.

46. The system of claim 43, wherein the control system characterizes the errors in the one or more sensor signals using a weighted sum of several exponential functions.

47. The system of claim 43, wherein the control system comprises a processor for correcting the one or more sensor signals having the errors, and determining the touch location using the corrected sensor signals.

48. The system of claim 43, wherein the control system further comprises a digital processing circuit configured to correct the one or more sensor signals.

49. The system of claim 43, wherein the control system further comprises:
a filter circuit for filtering uncorrected sensor signals;
a scaling circuit, coupled to the filter circuit, for scaling an output of the filter circuit to produce correction factors; and
a summing circuit for subtracting the correction factors from the uncorrected sensor signals to produce the corrected sensor signals.

50. The method of claim 43, wherein the filter circuit has a predetermined gain and a predetermined time constant.

51. The system of claim 43, wherein the control system further comprises analog circuitry configured to correct the one or more sensor signals.

52. A display system, comprising:
a touch screen system, including a touch surface;
a plurality of touch sensors, the touch sensors physically coupled to the touch surface and producing sensor signals in response to a touch force applied to the touch surface;
a control system, coupled to the touch sensors, the control system configured to detect one or more sensor signals having errors induced by a viscoelastic effect, correct the one or more sensor signals by reducing the viscoelastic induced errors, and determine a touch location using the corrected sensor signals, the control system characterizing the errors in the one or more sensor signals using an exponential function; and
a processor coupled to the display and the touch screen system for processing data to be displayed on the display and information received from the touch screen system.

53. The system of claim 52, wherein the display displays information through the touch screen.

54. The system of claim 52, wherein the display comprises a liquid crystal display, a light emitting diode display, a plasma display or a cathode ray tube display.

55. The system of claim 52, wherein the processor receives information regarding a touch made on the touch screen relative to information displayed on the display.

56. The system of claim 52, wherein the control system comprises a processor for correcting the one or more sensor signals having the errors, and determining the touch location using the corrected sensor signals.

57. The system of claim 52, wherein the control system is configured to characterize the errors in the one or more sensor signals and reduce the errors in the one or more sensor signals.

58. The system of claim 52, wherein the control system further comprises a digital processing circuit configured to correct the one or more sensor signals.

59. The system of claim 52, wherein the control system further comprises:
a filter circuit for filtering uncorrected sensor signals;
a scaling circuit, coupled to the filter circuit, for scaling an output of the filter circuit to produce correction factors; and
a summing circuit for subtracting the correction factors from the uncorrected sensor signals to produce the corrected sensor signals.

60. The system of claim 52, wherein the control system further comprises analog circuitry configured to correct the one or more sensor signals.

61. The system of claim 52, further comprising:
one or more data storage devices coupled to the processor for storing data;
one or more input devices for transferring information to the processor; and
one or more output devices for transferring information from the processor.

62. The system of claim 52, further comprising one or more interfaces for coupling the system to one or more networks.

63. A system for determining a touch location on a touch screen, comprising:
means for detecting one or more touch force responsive sensor signals characterized by an initial response to a step change in a touch force, the initial response being augmented by a monotonic increase in the sensor signals over a period of time;
means for preparing a correction value reflective of the monotonic increase in the sensor signals; and
means for determining the touch location using the correction value;
wherein the monotonic increase tends to an asymptotic value while the touch force is maintained, and means for preparing the correction value further comprises means for modeling the difference between the monotonically increasing response and the asymptotic value as a weighted sum of one or more exponentially decreasing functions of time.

64. The system of claim 63, wherein means for determining the touch location using the correction value comprises:
means for using the correction value to correct a first sensor signal; and
means for determining the touch location using the corrected first sensor signal.

65. A system for determining a touch location on a touch screen using a plurality of touch sensors mechanically coupled to a touch surface, comprising:
means for detecting at least a first touch force responsive sensor signal having a deviation from a proportional response to a touch force caused by viscoelasticity;
means for preparing a correction value reflective of the deviation caused by viscoelasticity, the means for preparing the correction value including means for modeling the deviation as a weighted sum of one or more exponentially decreasing functions of time and means for preparing a correction value reflective of the deviation so modeled; and
means for determining the touch location using the correction value.

66. The system of claim 65, wherein means for determining the touch location using the correction value comprises:
means for subtracting the correction value from a second sensor signal to form a corrected second sensor signal; and
means for determining the touch location using the corrected second sensor signal.

67. The system of claim 65, wherein means for determining the touch location using the correction value comprises:
means for substituting the correction value for said first weighted sum to form a corrected second sensor signal; and
means for determining the touch location using the corrected second sensor signal.

68. An article of manufacture comprising a program storage medium readable by a computer, the medium tangibly embodying one or more programs of instructions executable by one or more computers to perform a method for determining a touch location on a touch screen, the method comprising;
detecting one or more force responsive sensor signals having errors induced by a viscoelastic effect;
correcting the one or more sensor signals by characterizing the errors in the one or more sensor signals and reducing the viscoelastic induced errors; and
determining the touch location using the corrected sensor signal;
wherein characterizing the errors in the one or more sensor signals comprises characterizing the errors using an exponential function.

* * * * *